US010409469B2

(12) United States Patent
Cheng et al.

(10) Patent No.: US 10,409,469 B2
(45) Date of Patent: Sep. 10, 2019

(54) METHODS FOR DISPLAYING CONTENT IN A WINDOW OR TAB OF A BROWSER

(71) Applicant: POPIN INC., Tokyo (JP)

(72) Inventors: Tao Cheng, Tokyo (JP); Martin Miranda, Tokyo (JP)

(73) Assignee: POPIN INC., Tokyo (JP)

( * ) Notice: Subject to any disclaimer, the term of this patent is extended or adjusted under 35 U.S.C. 154(b) by 106 days.

(21) Appl. No.: 15/113,859

(22) PCT Filed: Feb. 27, 2015

(86) PCT No.: PCT/JP2015/055771
§ 371 (c)(1),
(2) Date: Jul. 25, 2016

(87) PCT Pub. No.: WO2015/129847
PCT Pub. Date: Sep. 3, 2015

(65) Prior Publication Data
US 2017/0031579 A1 Feb. 2, 2017

(30) Foreign Application Priority Data
Feb. 28, 2014 (JP) .................. 2014-037875

(51) Int. Cl.
*G06Q 30/00* (2012.01)
*G06F 3/0484* (2013.01)
(Continued)

(52) U.S. Cl.
CPC .......... *G06F 3/04847* (2013.01); *G06F 9/451* (2018.02); *G06F 16/986* (2019.01); *G06Q 30/0276* (2013.01)

(58) Field of Classification Search
CPC .............. G06F 3/04847; G06F 16/986; G06Q 30/0276
See application file for complete search history.

(56) References Cited

U.S. PATENT DOCUMENTS 6,510,531 B1 * 1/2003 Gibbons ............. G06F 11/3672
707/999.007
2003/0140050 A1 * 7/2003 Li ..................... G06F 17/30353
(Continued)

FOREIGN PATENT DOCUMENTS

JP  2005182364  7/2005
JP  2010015333  1/2010
(Continued)

OTHER PUBLICATIONS

Wikipedia, Median, URL capture date of Aug. 17, 2012, Internet Archive WayBack Machine.*
(Continued)

*Primary Examiner* — Maria V Vanderhorst
(74) *Attorney, Agent, or Firm* — Hodgson Russ LLP

(57) ABSTRACT

According to the present invention, a terminal executes a program correlated to content displayed in a window, etc., of a browser operating in the terminal. When the content is loaded into the window, etc., by execution of the program, the terminal registers a callback function by a window.requestAnimationFrame method assigned to the window, etc. When the callback function is invoked, the terminal determines, on the basis of an interval of timestamps at which the callback function is invoked with respect to the window, etc., whether or not the window, etc., is being browsed by a user, and re-registers the callback function by the window.requestAnimationFrame method assigned to the window, etc. The terminal intermittently notifies a server of the result of the determination.

19 Claims, 4 Drawing Sheets

(51) Int. Cl.
  *G06F 9/451* (2018.01)
  *G06F 16/958* (2019.01)
  *G06Q 30/02* (2012.01)
  *G05B 19/418* (2006.01)

(56) References Cited

U.S. PATENT DOCUMENTS

| | | | | |
|---|---|---|---|---|
| 2004/0210846 A1* | 10/2004 | Olsen | ............... | H04L 29/06 715/761 |
| 2006/0090023 A1* | 4/2006 | Olsen | ............... | G06F 21/554 710/107 |
| 2007/0140301 A1* | 6/2007 | Kailash | ............... | H04L 43/024 370/498 |
| 2008/0103888 A1* | 5/2008 | Weir | ............... | G06Q 30/02 705/14.56 |
| 2008/0186184 A1* | 8/2008 | August | ............... | G06F 21/88 340/572.7 |
| 2008/0201214 A1* | 8/2008 | Aaron | ............... | G06Q 30/02 705/14.47 |
| 2009/0024482 A1* | 1/2009 | Synstelien | ............... | G06Q 30/02 705/14.4 |
| 2009/0232221 A1* | 9/2009 | Cheng | ............... | G06Q 30/02 375/240.24 |
| 2009/0271514 A1* | 10/2009 | Thomas | ............... | G06F 11/3438 709/224 |
| 2010/0005403 A1* | 1/2010 | Rozmaryn | ............... | G06Q 30/02 715/760 |
| 2010/0023398 A1* | 1/2010 | Brown | ............... | G06Q 30/02 705/14.49 |
| 2010/0185973 A1* | 7/2010 | Ali | ............... | G06Q 10/06 715/781 |
| 2011/0264491 A1* | 10/2011 | Birnbaum | ............... | G06F 3/016 705/14.4 |
| 2012/0079366 A1* | 3/2012 | Cohen | ............... | G06Q 30/0241 715/234 |
| 2012/0158478 A1* | 6/2012 | Holder | ............... | G06Q 30/0217 705/14.19 |
| 2013/0227607 A1* | 8/2013 | Saltonstall | ............... | H04N 21/458 725/35 |
| 2014/0006951 A1* | 1/2014 | Hunter | ............... | H04H 60/31 715/719 |
| 2015/0113385 A1* | 4/2015 | Schumacher | ............... | G06F 17/30905 715/240 |
| 2015/0193817 A1* | 7/2015 | Dharmaji | ............... | G06Q 30/0273 705/14.45 |

FOREIGN PATENT DOCUMENTS

| | | |
|---|---|---|
| JP | 4423406 | 3/2010 |
| JP | 2010250795 | 3/2010 |
| WO | 2013178805 | 12/2013 |

OTHER PUBLICATIONS

Stat Trek, How to Describe Data Patterns in Statistics, URL capture date of Aug. 6, 2012, Internet Archive WayBack Machine.*
The Free Dictionary, Demarcation, The Free Dictionary.*
HTML5rocks, Improving the Performance of your HTML5, Internet Archive WayBack Machine Capture Date of Jul. 12, 2011 (Year: 2011).*
Animating with javascipt: from setinterval to requestAnimationFrame, Internet Archive WayBack Machine Capture Date of Nov. 2, 2011 (Year: 2011).*
Wikipedia, Callback Computer Programming, Internet Archive Way Back Machine Capture date of Nov. 29, 2011 (Year: 2011).*
Wikipedia, Event (Computing), Internet Archive Way Back Machine Capture date of Sep. 14, 2011 (Year: 2011).*
HTML5 visual composition of REST-like web services (Year: 2013).*

* cited by examiner

METHODS FOR DISPLAYING CONTENT IN A WINDOW OR TAB OF A BROWSER

CROSS-REFERENCE TO RELATED APPLICATIONS

This application is a national phase entry under 35 USC § 371 of International Application PCT/JP2015/055771, filed Feb. 27, 2015, which is based on and claims priority to Japanese Patent Application No. 2014-037875, filed on Feb. 28, 2014, the entire contents of which are incorporated herein by reference.

TECHNICAL FIELD

The present disclosure relates to a program for determining whether content displayed in a window or a tab of a browser is being browsed by a user.

BACKGROUND

In the past, values such as pageviews of content per unit time or residence time on content are used as indices representing the degree in reading the content published on World Wide Web. These values are measured based on the time when a server is accessed, as disclosed in the patent document 1.

PRIOR ART DOCUMENT

Patent Document

Patent document 1: JP 2010-015333A

SUMMARY

Technical Problem to be Solved

The desire for further accurately determining whether the content in a terminal is being browsed is strong. Besides, there is also a desire for knowing whether the text of content is read through, read intensively by a user, and the degree in reading the text of content intensively.

The present disclosure aims to solve the above problems, and the objective of the present disclosure is to provide a program for determining whether content displayed in a window or a tab of a browser is being browsed by a user.

Technical Solution for Solving Problems

A program involved in the present disclosure is corresponding to a content displayed in a window or a tab of a browser running on a terminal, in which, by executing the program, the terminal is configured to:
register, by a "window.requestAnimationFrame" method assigned to the window or the tab, a callback function defined by the program, when the content is loaded into the window or the tab;
determine whether the window or the tab is being browsed by a user based on a time interval of timestamps at which the callback function is invoked for the window or the tab, and re-register the callback function by the "window.requestAnimationFrame" method assigned to the window or the tab, when the callback function is invoked; and
notify a server of a determination result intermittently.
In the program involved in the present disclosure, by executing the program, the terminal is configured to:
calculate a read-through rate for the content according to the determination result and whether respective elements contained in the content are depicted in the window or the tab readably at a time point when determining whether the window or the tab is being browsed by the user, when the callback function is invoked;
notify the server of the read-through rate intermittently.
Additionally, in the program involved in the present disclosure, by executing the program, the terminal is configured to:
determine whether the respective elements are read through according to the determination result and whether the respective elements contained in the content are depicted in the window or the tab readably at the time point when determining whether the window or the tab is being browsed by the user, when the callback function is invoked;
identify a demarcation between an element that is read through and an element that is not read, if the read-through rate exceeds a preset threshold;
insert an advertisement at the demarcation, or pop-up an advertisement in front of the demarcation for displaying by only overlaying the element that is read through.
A program involved in another viewpoint of the present disclosure, corresponding to a content displayed in a window or a tab of a browser running on a terminal, in which, by executing the program, the terminal is configured to:
intermittently determine whether the window or the tab is being browsed by a user;
calculate a read-through rate for the content and determine whether respective elements contained in the content are read through, according to a determination result of determining whether the window or the tab is being browsed and according to whether the respective elements are depicted in the window or the tab readably at a time point when determining whether the window or the tab is being browsed by the user;
identify a demarcation between an element that is read through and an element that is not read, if the read-through rate exceeds a preset threshold;
insert an advertisement at the demarcation, or pop-up an advertisement in front of the demarcation for displaying by only overlaying the element that is read through.

Technical Effect

According to the present disclosure, a program for determining whether content displayed in a window or a tab of a browser is being browsed by a user may be provided.

DETAILED DESCRIPTION

Embodiments of the present discourse will be described as follows. Further, the embodiments are only explanatory, illustrative, and shall not be construed to limit the scope of the present disclosure. Therefore, all other embodiments made by one skilled in the art in light of the embodiments of the present disclosure by replacing one, part or all of elements with their equivalents without creative work are included in the protection scope of the disclosure.

Embodiment 1

In this embodiment, the "window.requestAnimationFrame" method assigned to a window or a tab displaying content is used. This method is used for registering a callback function which is invoked when finishing a preparation for updating (re-depicting) the picture display. The callback function is defined by a script program corresponding to the content. The script program is typically written in the JavaScript (registered trademark) programming language.

In order to enable a window displaying the content to be visible to the user, it is required to ensure that the window is not overlaid by other windows (including a window or a tab of a browser, and also including windows of other application programs).

Generally, the browser frequently updates (re-depicts) the picture display for the window visible to the user, but reduces the frequency of updating (re-depicting) for the hidden window or the window which is not concerned, so as to restrain the computation load.

Accordingly, it may be assumed that there are two peaks for the time interval of invoking the callback function, which are at a time when the window is visible to the user and a time when the window is invisible to the user.

Therefore, in the present disclosure, a median value of these two peaks is used as a threshold. If the time interval of invoking the callback function is below the threshold, it is determined that the window is visible to the user. If the time interval is less than the threshold, it is determined that the window is invisible to the user.

The registration of the callback function is performed for the first time when the content is loaded into the window. Then, whenever the callback function is invoked, the callback function is re-registered. Thus, whenever the system finishes a preparation for updating (re-depicting) the picture display of the window, the callback function is invoked.

In the callback function, reference is made to an array for managing the invoking time. The array is initialized when the content is loaded into the window or when the callback function is invoked for the first time with respect to the window.

Figure 1:
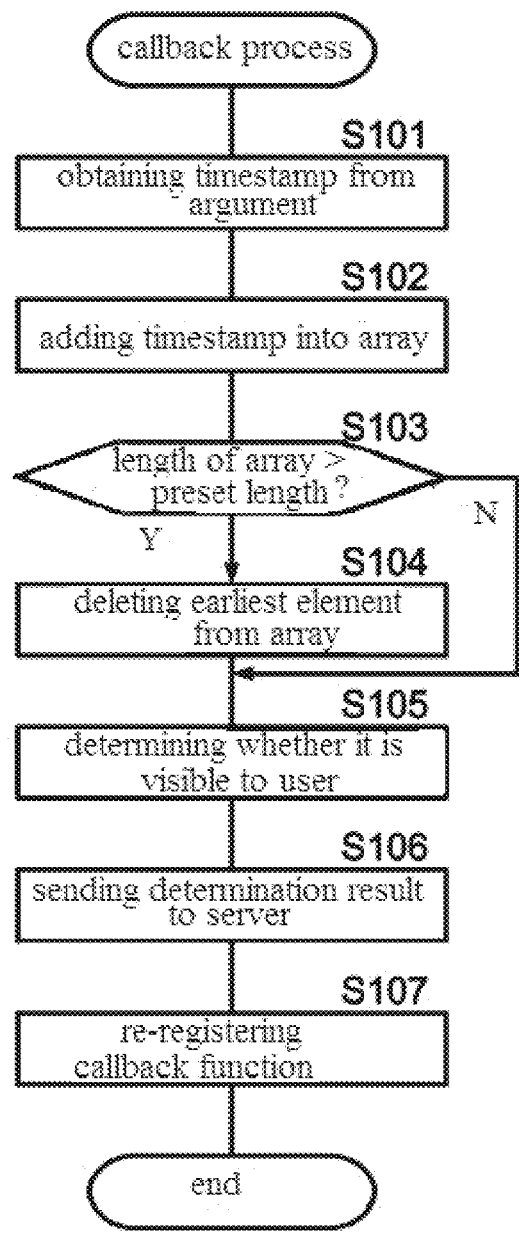
FIG. 1 is a flow chart of processing content via a callback function according to an embodiment of the present disclosure.

FIG. 1 is a flow chart of processing content via a callback function according to an embodiment of the present disclosure. Embodiments of the present disclosure will be described below with reference to FIG. 1.

As shown in FIG. 1, when a callback function is invoked, firstly an argument passed to the callback function is obtained at a terminal running a browser (step S101). The argument represents a timestamp at which the callback function is invoked.

Then, the terminal adds the timestamp obtained into an array (step S102). And then, if the length of the array exceeds a preset length (step S103, yes), the earliest element in the array is deleted (step S104). If the length does not exceed the preset length (step S103, no), step S105 is executed directly.

Then, the terminal determines whether the window is visible to the user currently (i.e., whether the content is being browsed by the user) based on the historical record of timestamps added into the array (step S105). Specifically, the following ways may be considered.

Way 1: the above threshold is derived by experiments for a typical browser and terminal, and the determination is realized based on a difference of two latest timestamps and based on the above threshold. By this, the preset length of the array may be 2. Instead of based on the array, by storing a variable representing the last timestamp, the difference of the variable from a timestamp which is passed as the argument may be calculated.

According to experiments, in a large number of terminals and browsers, a depiction of about 30 frames per second is performed in the window visible to the user, while a depiction of about 10 frames per second is popular in the hidden window. By this, about 0.0500 s-0.0667 s (about 15 frames-20 frames per second) may be used as the threshold.

Way 2: the determination is realized by determining the threshold adaptively according to a distribution of differences between adjacent timestamps added into the array.

The above differences are sequenced in an order from small to large. An average of top-ranked differences (the top half, the first one-third, the first quarter, a predetermined quantity, etc.) is determined as a peak of the invoking interval when the window is visible. And an average of bottom-ranked differences (similar to the top-ranked differences) is determined as a peak of the invoking interval when the window is invisible. A difference of these two peaks is used as the threshold.

Additionally, it may be assumed that the above difference may be obtained by superposing two normal distributions one of which has a mean and a variance both different from those of the other. The respective means are calculated and a median value of these two means is used as the threshold.

Furthermore, if the threshold is determined adaptively, preferably, it is not determined with the window or tab as unit, but is determined with the browser as unit in particular, if different contents are displayed in many windows or tabs of a browser, the threshold is determined based on a distribution gathering differences calculated from the callback functions registered in respective contents, and thus the threshold corresponding to the performance of terminal or the installation of browser may be determined.

Moreover, the above two ways may be combined. For example, after the callback function involved in this embodiment is registered in the browser for the first time, way 1 is used for a certain number of times, while way 2 is used after enough differences are obtained.

Further, the threshold determined in the past may be stored as a reference value based on cookie, which may be used as an initial value for next time.

Then, the terminal sends a determination result to a server (step S106). The sending to the server may not be conducted at each time when the callback function is invoked, but be conducted only when the determination result is changed. Alternatively, the determination result may be sent to the server intermittently by invoking a handler function registered by "setInterval( )" at intervals.

Then, the terminal re-registers the callback function via the "window.requestAnimationFrame" method (step S107), so as to finish the execution of the callback function.

In this way, it may be determined accurately whether the content to be depicted in the window is visible to the user in a small time unit.

Embodiment 2

As described in above embodiment, if it may be determined accurately whether the content is visible to the user in a small time unit, then the read-through rate (intensive reading rate) representing whether the content is intensively read or extensively read by the user may be determined.

In this way, firstly, when the content is loaded, it is determined which part is the text (the part of the content except the advertisement or navigation bar) of content. At this time, various text extracting technologies may be used. For example, a label with a specific property may be designated for the part equivalent to the text in advance.

Additionally, there are many ways for determining which part of DOM Tree is the text of content, which are as follows. The transverse width and the longitudinal width of a picture are obtained when assuming that the picture displays the content. Based on the transverse width and the longitudinal width, the picture display of the content is divided into four regions: upper left region, upper right region, lower left region and lower right region. A node displayed in the upper left region (or other regions) is extracted from nodes in the web document. The area of a region displaying the beginning of the node and containing the centre of picture is calculated, and the node with the area within a preset range or with the maximal area is used as the beginning node of the text.

Also, for each element in the text of content (with the label, character, word, line as unit), the readable duration of each element in which the element is visible to the user is accumulated.

In other words, it is determined in the callback function whether each element in the text of content is located at a position to be depicted in the window and whether the content is being browsed by the user, i.e., whether it is in a readable state. If it is in the readable state, a latest time interval of timestamps is partitioned into the readable durations of respective elements currently located at a position to be depicted in the window. When partitioning the time interval, a weighting may be performed based on the type of each element, which may be text, static picture, dynamic picture. If the type is text, the weighting is performed based on the category of text or the length of text string. If the type is static picture or dynamic picture, the weighting is performed based on the display size. Additionally, with regard to the elements displayed in the upper section and lower section of the browser picture, the weight for the element displayed in the upper section may be increased. The reason is that, the user reads the content from the beginning conventionally. After being scrolled, the position where the element is currently located may be researched, and the weight used for partitioning is calculated based on this. In this way, if it is determined that the content is being browsed by the user in the latest and the former invoking of the callback function, then the difference is partitioned.

On the other hand, simply speaking, if it is determined that the content is not being browsed in at least one of the latest and the former invoking, the difference is not partitioned. This is because the callback function is invoked frequently when the user is browsing the content, and the error of time when it is switched from the readable state to the unreadable state may be ignored.

Moreover, the partition is not performed when switching from the unreadable state to the readable state, conversely, the partition may be performed, or time period equal to half of the difference may be partitioned.

Based on this, it is indentified whether an element is read through, according to whether or not the accumulated readable duration assigned to the element exceeds a read-through duration corresponding to this type of element. The read-through duration may be derived from the statistics about the average read-through duration of human based on the category of text, length of text string, size and re-production time of static or dynamic picture, or the like; or may be derived from the reading history for each user.

When accumulating the statistics, it is necessary to research the time when each element is displayed, while this information may be collected by the callback function.

Generally, for the content, people may extensively read, intensively read, or may do nothing with the content, keeping it being displayed. Thus, according to the above embodiments, it may be determined whether the content is in a visible state for the user, and the threshold or read-through duration may be calculated by performing the above statistic process with the overall users or a single user as unit, on the basis of deriving the total time during which the content is in the visible state.

Finally, the read-through rate is calculated by identifying what percentage of elements in the text of content is read through. Typically, the calculated read-through rate is sent to the server, together with the determination result of determining whether the content is visible.

As described in above embodiments, if whether the content is being browsed by the user and the read-through rate (intensive reading degree) for the content may be accurately determined and the information may be obtained from the server almost in real time, advertisements may be provided as follows.

Firstly, an appropriate advertisement strategy or SEO (search engine optimization) strategy is implemented according to the duration of time during which the content remains to be readable, or according to the read-through rate (intensive reading degree) for the content. Compared to the traditional analysis with the pageview or residence time as unit, a more accurate analysis may be performed and a more effective strategy may be implemented. In addition, the advertising expenses may be calculated according to the success or failure of reading, the duration for reading, and the intensive reading degree obtained from this embodiment.

Further, this is a method for pushing advertisements (such as limited-time coupons) from the server to the browser at the time when the content is being browsed, when the content is read through just now, or when the content is read through roughly. The pushing may be conducted automatically, or be conducted by the server operator by observing the reading behavior of user at the server. With this method, the advertisement may be provided precisely according to the reading behavior of user, such that a better advertising effect may be expected.

The advertisement (such as limited-time coupons) may not be based on the pushing. That is, when calculating the read-through rate, the callback function of the script program compares the read-through rate with the threshold for displaying the advertisement. And then, if the read-through rate exceeds the threshold for displaying the advertisement, the callback function obtains the advertisement from the server, and popes up and displays the advertisement in the content or inserts the advertisement near a place where the user is reading.

Figure 3:
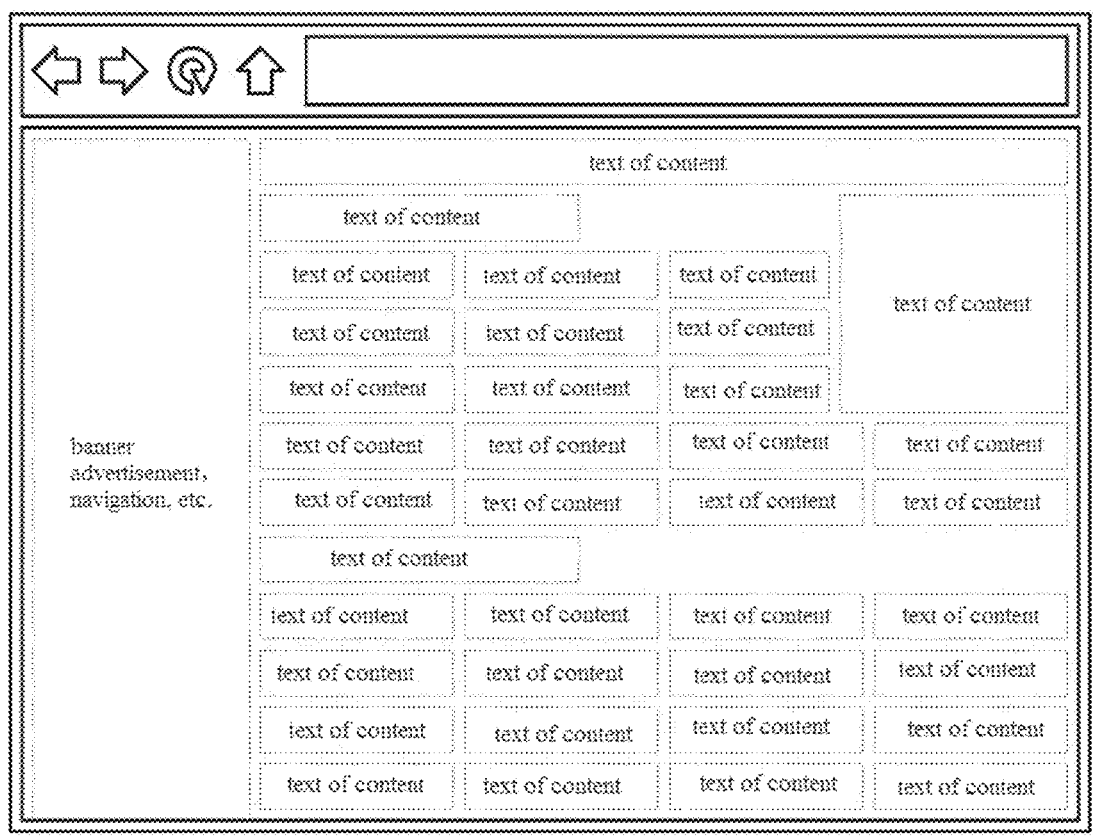
FIG. 3 is a schematic diagram showing an example of displaying content according to an embodiment of the present disclosure.

The position where the advertisement is inserted or popped up may be determined as follows. FIG. 3 is a schematic diagram showing an example of displaying content according to an embodiment of the present disclosure. In FIG. 3, in order to show the position and size of each element, each element is surrounded by a dotted line which is not displayed in the real browser picture.

Also, starting from the beginning, the program compares whether the readable duration for each element contained in the part equivalent to the text of content exceeds the read-through duration for the element, i.e., whether the element is read through.

Figure 4:
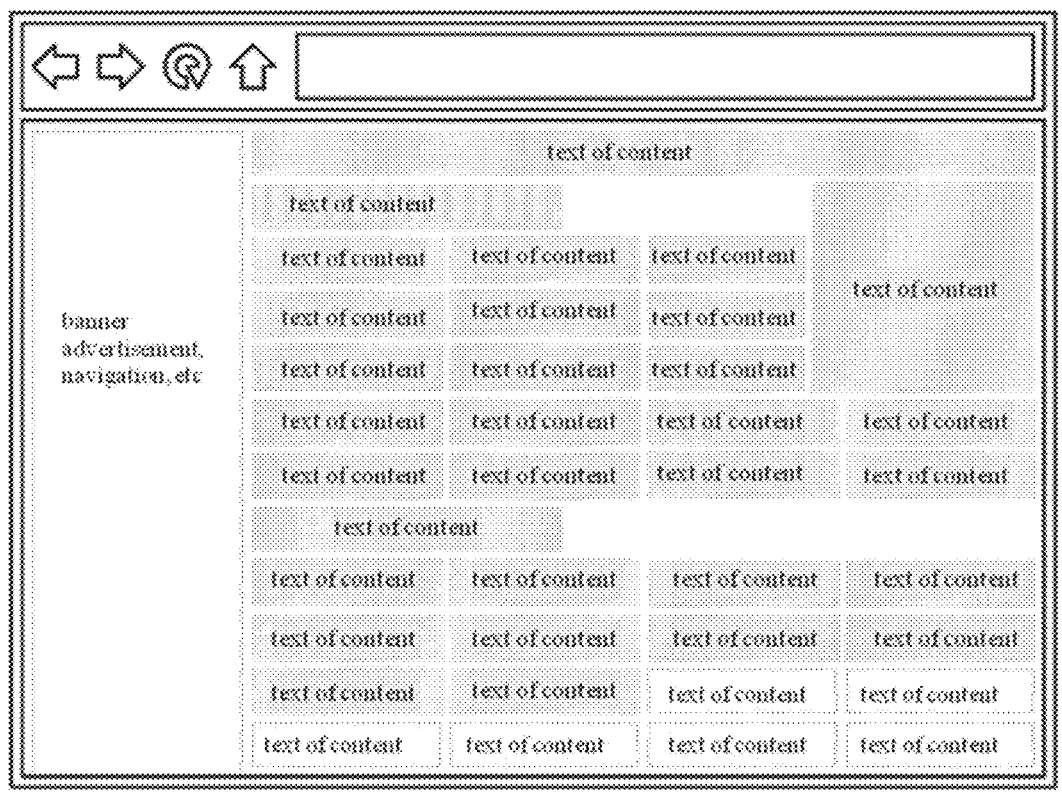
FIG. 4 is a schematic diagram showing a read or unread state of elements in the content according to an embodiment of the present disclosure.

FIG. 4 is a schematic diagram showing a readable or unreadable state of an element in the content according to an embodiment of the present disclosure. In FIG. 4, slashes are filled in the background of the part of content which has been read through. The place of demarcation where it is transitioned from continuous elements exceeding the threshold to continuous elements not exceeding the threshold is researched. The place is determined as the place where the user is reading currently.

Figure 5:
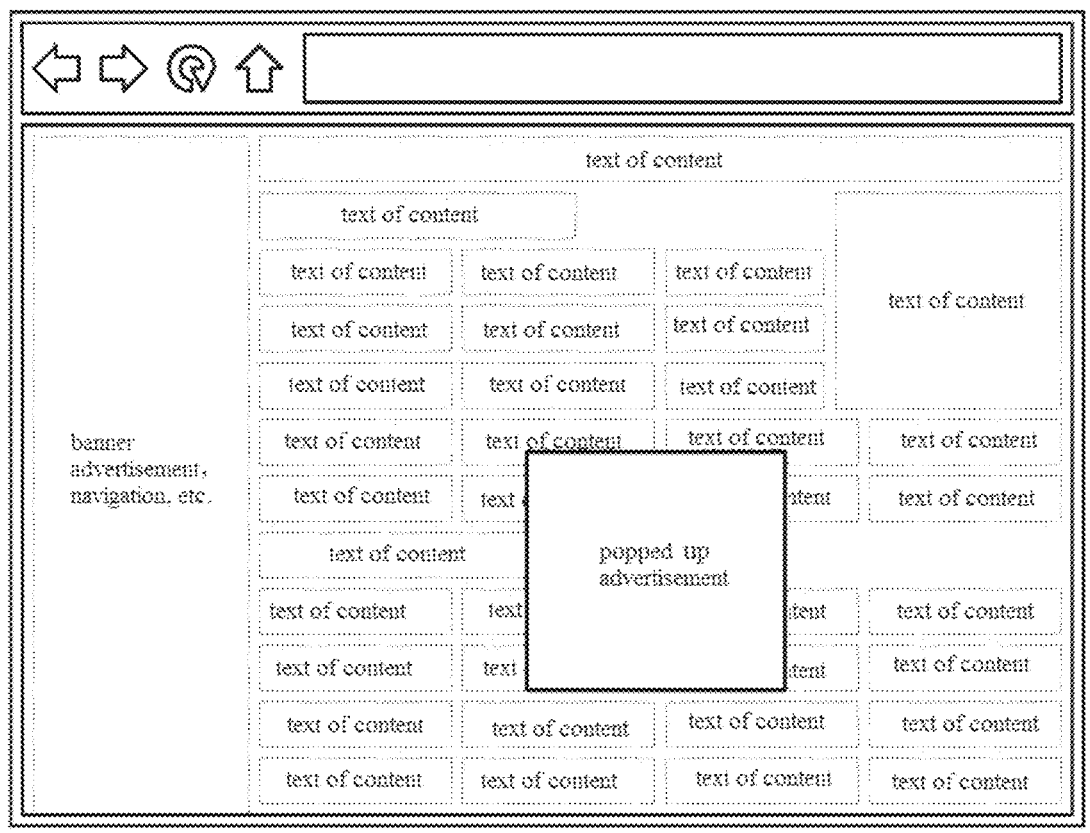
FIG. 5 is a schematic diagram showing an example of displaying content and a popped-up advertisement according to an embodiment of the present disclosure.

The program may insert the advertisement in front of the place. In addition, on the basis of identifying the region where the elements having been read through are displayed on the browser picture, the advertisement may be displayed by overlaying the foot of the region, or may be popped up for displaying. FIG. 5 is a schematic diagram showing an example of displaying content and a popped up advertisement according to an embodiment of the present disclosure. As shown in FIG. 5, preferably, the advertisement is popped up, or popped out for displaying without overlaying the element which is not read through and the banner advertisement displayed already. In addition, preferably, the position of popping up the advertisement is near the unread element as much as possible. This is because the region close to the unread element is presumed as the place where the user is staring.

The region close to the unread element may be exactly in front of the demarcation or may be a line ahead of the demarcation. In FIG. 5, the popped up advertisement is configured in such a way that the bottom of the line ahead of the demarcation meets the bottom of the popped up advertisement, and the centre of demarcation is in consistence with the centre of the popped up advertisement. However, the position of the popped up advertisement may be changed properly, for example, the popped up advertisement is displayed with certain spacing; or, if the popped up advertisement cannot be inserted in front of the demarcation, it can be located at the line ahead of the demarcation.

As described above, by displaying the advertisement near the demarcation between an element which has been read through and an element which is not read through, without overlaying the element which is not read through, the confusion of user may be avoided.

In addition, various ways may be adopted randomly to some extent with respect to calculating the threshold for displaying the advertisement, the method of popping up the advertisement for displaying and the location where the advertisement is displayed. The conversion rate is measured for each way, so as to perform an automatic adjustment for improving the probability of using the way with the highest rate. The automatic adjustment may be performed with a single user or the overall users as unit.

According to this embodiment, the readable duration of each element and the read-through rate for the content may be analyzed for providing the advertisement properly.

Embodiment 3

In this embodiment, a method for publishing and executing the script program in the above embodiments is described. In the present disclosure, the server for publishing the script program and the server for publishing the content may be a same server, or may be different servers. Thus, the former may be referred to as a script server, and the latter may be referred to as a content server.

Figure 2:
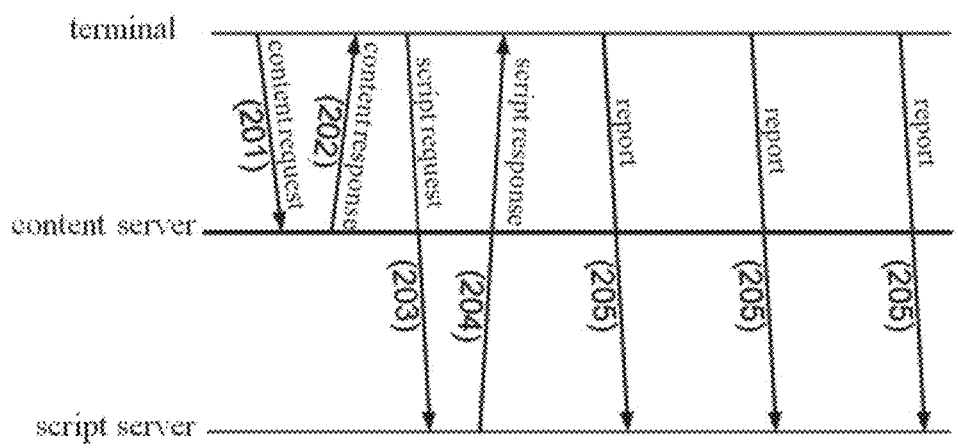
FIG. 2 is a schematic diagram showing a communication session according to an embodiment of the present disclosure.

FIG. 2 is a schematic diagram showing a communication session according to an embodiment of the present disclosure. Embodiments will be described as follows with reference to this figure.

Firstly, a browser running on a terminal is operated by a user, and a content request for obtaining the content is sent from the browser to the content server (201). Typically, the operation is selecting a link shown in other content which is already displayed in the browser, or inputting a Universal Resource Locator (URL) in the address field of the browser.

The content server receiving the content request sends a content response indicating the content corresponding to the content request to the terminal (202). The content indicated in the content response, typically may be a page in the form of HTML (Hyper Text Markup Language). In this HTML, the URL of the script program which is required to be read when the terminal loads the page is recorded. Typically, the script program is written in the JavaScript (registered trademark) programming language.

By means of the terminal receiving the content response, the browser begins the depicting process of the content. In this process, if the URL of script program is found, the terminal sends a script request for obtaining the script program to the script server (203).

The script server receiving the script request sends a script response indicating the script program corresponding to the script request to the terminal (204).

By means of the terminal receiving the script response, the browser performs the onload process specified for the onload event of the content. In this onload process, the callback function specified by the script program is registered by the "window.requestAnimationFrame" method of the window or tab.

Then, the above process is performed in the browser of the terminal, such that a report indicating information such as the determination result of determining whether the content is being browsed currently or the read-through rate of the content is sent from the terminal to the script server intermittently (205).

In this way, according to this embodiment, the provider of content only needs to specify the URL redirection of script program and the process for registering the callback function in the onload event in the provided content, which may be realized by just inserting a short HTML segment template into the content.

The information about whether the content is browsed or the information about the read-through rate is transmitted to the provider of content after being counted and processed in the script server. Thus, the provider of content may also properly analyze the response to the content provided by itself.

In addition, according to the record of script, the destination to which the report from the terminal is sent may be used as the content server. In this way, as described above, the content server may observe the behavior of the reader, and pushes the limited-time coupons or the like at the time when the content will be read through right away.

Embodiment 4

In this embodiment, a method for determining which node in the DOM tree of content is the text node representing the text of content is described, which is different from the above embodiments.

Firstly, as described in the above embodiments, it is also assumed that the content is displayed in the current browser picture, and the node displayed in the first view is extracted from the DOM tree.

Then, the area of the region for depicting a node in the browser picture of the first view is calculated, and the node with maximal area is used as the candidate node.

Based on this, with regard to the candidate node, the node meeting the area condition "the depicting area of the node is higher than Z % of that of the parent node of the node and the depicting area of each child node of the node is not higher than Z % of that of the node" is used as the text node. A constant Z may be determined by multiple experiments. For the widely used content, the value in a range of about 65-75 is appropriate for Z.

The extraction of candidate node and the retrieval of text node may be implemented by performing a breadth-first search or depth-first search on the body node of the DOM tree of content. It is determined whether the node with maximal area depicted in the first view and from the child nodes of the body node satisfies the above-mentioned area condition, if yes, the node is text node, otherwise, the searching process is performed repeatedly, i.e., it is determined whether the node with maximal area depicted in the first view and from the child nodes of this node satisfies the above-mentioned area condition, if yes, the node from the child nodes of this node is text node.

Additionally, taking the layout of page, the size of advertisement at the beginning of the page into account, the depicting area of each node may be the depicting area of each node when the whole content is displayed, rather than the area for displaying in the picture under first view. Moreover, the search may start from the node required to be displayed in the browser picture of first view and taken from child nodes of the body node. However, similar to the above embodiments, the search may start from the node required to be displayed in the upper left region of the browser picture, in which the browser picture is divided into four equal regions.

According to this embodiment, even if the special tag is not provided, the text of content may be determined automatically, such that the affect of the advertisement and various navigation elements appended to the content may be restrained, thus the read-through rate for the text of content may be researched more accurately.

Embodiment 5

In the above embodiments, the callback function is registered by the "window.requestAnimationFrame" method. It is determined whether the content is displayed to be visible to the user according to the time interval of invoking the callback function, or by mans of the function "page visibility" installed in the browser recently.

In order to use the function, the handler function for the event "visibilitychange" may be used. Once the event "visibilitychange" occurs, the handler function is invoked, and the property "document.visibilityState" is researched in the handler function. If the value for the property is "visibile", then the page is in the readable state currently. If the value for the property is "hidden" or "prerender", then the page is in the invisible state for the user. The event "Visibilitychange" occurs intermittently.

Furthermore, in order to execute the handler function intermittently, the registration may also be realized by the "setInterval( )" method. If the value for property "document.visibilityState" is "visibile", then the readable duration of each element depicted in the browser picture currently is accumulated.

In addition, according to different browsers, the implementation of this function may be distinct. Thus, if the type of browser cannot be determined at the server, the script accumulates the readable duration of respective elements by the method based on "window.requestAnimationFrame" and the method based on "page visibility", and calculates the difference between the two readable durations obtained respectively by these two methods, and if the difference is small, reports the intention for taking a change to the server when a change is required for using any one of the method based on "window.requestAnimationFrame" and the method based on "page visibility".

After receiving the report, the server determines which one of the method based on "window.requestAnimationFrame" and the method based on "page visibility" is used in this type of browser, and then changes the configuration to use the determined method when the script is executed in this type of browser.

According to this embodiment, it may be determined properly which one of the method based on "window.requestAnimationFrame" and the method based on "page visibility" is used according to the type of browser.

Embodiment 6

In the callback function or handler function, by performing the following process, it may be presumed to some extent whether the reason resulting in the page being switched into the readable state again is the operation on "back" button of the browser after the page is directed into other page or the switching of the window or tab.

If the operation on "back" button is performed, it is popular for the browser to display the content as the content browsed last time, especially for the content changing dynamically.

On the other hand, during the switching of the window or tab, the state previously displayed in the browser picture is in consistence with the state displayed now after it is changed into the readable state again.

Thus, in this embodiment, the program stores the depicting position or depicting size of the text of content in the browser picture into the variable of JavaScript (registered trademark) or cookie.

If the content is switched from the unreadable state to the readable state, the program researches the difference between the depicting positions or depicting sizes of the text of content respectively presented currently and presented when the content is in the readable state last time.

Then, if there is a difference, the program determines that it is switched to the readable state by performing the operation on "back" button. If there is no difference, it is determined that it is switched to the readable state by switching the window or tab.

According to this embodiment, the user's behavior leading to returning to the content from which a temporary jump has been made to other content may be analyzed, such that the structure of content may be adjusted according to the user's behavior.

Summary

As described above, the program involved in the above embodiments is corresponding to a content displayed in a window or a tab of a browser running on a terminal, in which, by executing the program, the terminal is configured to:

register, by a "window.requestAnimationFrame" method assigned to the window or the tab, a callback function defined by the program, when the content is loaded into the window or the tab;

determine whether the window or the tab is being browsed by a user based on a time interval of timestamps at which the callback function is invoked for the window or the tab, and re-register the callback function by the window.requestAnimationFrame method assigned to the window or the tab, when the callback function is invoked; and notify a server of a determination result intermittently.

Further, by executing the program, the terminal is configured to:

calculate a read-through rate for the content according to the determination result and whether respective elements contained in the content are depicted in the window or the tab readably at a time point when determining whether the window or the tab is being browsed by the user, when the callback function is invoked;

notify the server of the read-through rate intermittently.

Further, by executing the program, the terminal is configured to:

determine whether the respective elements are read through according to the determination result and whether the respective elements contained in the content are depicted in the window or the tab readably at the time point when determining whether the window or the tab is being browsed by the user, when the callback function is invoked;

identify a demarcation between an element that is read through and an element that is not read, if the read-through rate exceeds a preset threshold;

insert an advertisement at the demarcation, or pop-up an advertisement in front of the demarcation for displaying by only overlaying the element that is read through.

The program involved in the above embodiments, corresponding to a content displayed in a window or a tab of a browser running on a terminal, in which, by executing the program, the terminal is configured to:

intermittently determine whether the window or the tab is being browsed by a user;

calculate a read-through rate for the content and determine whether respective elements contained in the content are read through, according to a determination result of determining whether the window or the tab is being browsed and according to whether the respective elements are depicted in the window or the tab readably at a time point when determining whether the window or the tab is being browsed by the user;

identify a demarcation between an element that is read through and an element that is not read, if the read-through rate exceeds a preset threshold;

insert an advertisement at the demarcation, or pop-up an advertisement in front of the demarcation for displaying by only overlaying the element that is read through.

Changes, alternatives, and modifications can be made in the embodiments without departing from spirit, principles and scope of the present disclosure. Additionally, the above embodiments are merely explanatory, illustrative, and used to generally understand the present disclosure. The embodiments shall not be construed to limit the scope of the present disclosure. In other words, the scope of the present disclosure is not defined by the embodiments, but by the claims. Also, various modifications of the embodiments implemented in the scope of claims and invention meaning equivalent thereto fall within the scope of the present disclosure.

The present application is based upon and claims priority to Japanese Patent Application No. 2014-037875, filed on Feb. 28, 2014 (Friday), the entirety contents of which are incorporated herein by reference.

INDUSTRY AVAILABILITY

According to the present disclosure, a program for determining whether content displayed in a window or a tab of a browser is being browsed by a user may be provided.

What is claimed is:

1. A method for displaying content displayed in a window or a tab of a browser running on a terminal, comprising:

registering, by a window.requestAnimationFrame method assigned to the window or the tab, a callback function, when the content is loaded into the window or the tab, the content including a plurality of elements visible within the window or tab of the browser;

determining whether the window or the tab is being browsed by a user based on a time interval of timestamps at which the callback function is invoked for the window or the tab, and re-register the callback function by the window.requestAnimationFrame method assigned to the window or the tab, when the callback function is invoked;

notifying a server of a determination result intermittently;

determining an advertisement location based on which respective elements of the plurality of elements are read through according to the determination result, including determining a read-through part of the content based on comparing a readable duration of each of the respective elements to a respective read-through duration for each of the respective elements, and filling slashes in a background of the content on an element-by-element and line-by-line basis when the readable duration exceeds the read-through duration, such that a read-through part corresponds to a subset of all visible content of the plurality of elements visible within the window or tab of the browser, the advertisement location being a unique x-y location within the window or tab of the browser; and positioning an advertisement or pop-up an advertisement at the advertisement location such that the advertisement is located only over a slashed portion of the content.

2. The method according to claim 1, further comprising:

calculating a read-through rate for the content according to the determination result and whether respective elements contained in the content are depicted in the window or the tab readably at a time point when determining whether the window or the tab is being browsed by the user, when the callback function is invoked; and notifying the server of the read-through rate intermittently.

3. The method according to claim 2, wherein:

determining whether the respective elements are read through according to the determination result and whether the respective elements contained in the content are depicted in the window or the tab readably at the time point when determining whether the window or the tab is being browsed by the user, when the callback function is invoked;

identifying a demarcation between an element that is read through and an element that is not read, if the read-through rate exceeds a preset threshold; and inserting an advertisement at the demarcation, or pop-up an advertisement in front of the demarcation for displaying by only overlaying the element that is read through.

4. The method according to claim 2, wherein calculating a read-through rate for the content according to the determination result and whether respective elements contained in the content are depicted in the window or the tab readably at a time point when determining whether the window or the tab is being browsed by the user by steps of:

determining which part of the content is text;

for each element in the text of the content, accumulating a readable duration of each element during which the element is visible to the user;

identifying whether an element is read through, according to whether or not the accumulated readable duration assigned to the element exceeds a read-through duration corresponding to a type of the element; and calculating the read-through rate by identifying what percentage of elements in the text of the content is read through.

5. The method according to claim 4, wherein a node in the text meets an area condition that a depicting area of the node is higher than Z % of that of a parent node of the node and a depicting area of each child node of the node is not higher than Z % of that of the node.

6. The method according to claim 5, wherein a value in a range of 65-75 is appropriate for Z.

7. The method according to claim 1, wherein determining whether the window or the tab is being browsed by a user based on a time interval of timestamps at which the callback function is invoked for the window or the tab when the callback function is invoked, is performed by steps of:

obtaining an argument passed to the callback function when the callback function is invoked, wherein the argument represents a timestamp at which the callback function is invoked;

adding the timestamp into an array; and determining whether the window or the tab is being browsed by the user based on a historical record of timestamps added into the array.

8. The method according to claim 7, wherein determining whether the window or the tab is being browsed by the user based on a historical record of timestamps added into the array comprises:

calculating a difference of two latest timestamps added into the array;

comparing the difference of two latest timestamps with a preset threshold; and determining that the window or the tab is being browsed by the user if the difference of two latest timestamps is below the threshold, and determining that the window or the tab is not being browsed by the user if the difference of two latest timestamps is not below the threshold.

9. The method according to claim 8, wherein the preset threshold is obtained by performing experiments for the browser and the terminal.

10. The method according to claim 8, wherein the preset threshold is obtained by:

determining a distribution of differences between adjacent timestamps added into the array;

determining a first peak of an invoking interval when the window or the tab is being browsed by the user and a second peak of the invoking interval when the window or the tab is not being browsed by the user according to the distribution of differences between adjacent timestamps; and defining a difference between the first peak and the second peak as the preset threshold.

11. The method according to claim 7, wherein the content is displayed in a page on the browser and the method further comprises:

determining whether a reason resulting in the page being switched into a readable state again is an operation on a back button of the browser after the page is directed into another page or a switching of the window or the tab.

12. The method according to claim 1, wherein notifying a server of a determination result intermittently is performed by at least notifying the server of the determination result when the determination result is changed.

13. The method according to claim 1, wherein notifying a server of a determination result intermittently is performed by at least invoking a handler function registered by setInterval( ) at intervals.

14. The method according to claim 1, wherein the content is displayed in a page on the browser and the method further comprises:

determining whether a reason resulting in the page being switched into a readable state again is an operation on a back button of the browser after the page is directed into another page or a switching of the window or the tab.

15. A method, corresponding to a content displayed in a window or a tab of a browser running on a terminal, wherein:

intermittently determine whether the window or the tab is being browsed by a user;

calculating a read-through rate for the content, the content including a plurality of respective elements visible within the window or tab of the browser, and determine whether the respective elements contained in the content are read through by comparing a readable duration for each of the respective elements to a respective read-through duration for each of the respective elements, according to a determination result of determining whether the window or the tab is being browsed and according to whether the respective elements are depicted in the window or the tab readably at a time point when determining whether the window or the tab is being browsed by the user and based on category of text, length of text string, size and re-production time of static or dynamic picture, and reading history of a user;

identifying a demarcation between an element that is read through and an element that is not read, the demarcation being a unique x-y location within the window or tab of the browser, if the read-through rate exceeds a preset threshold;

filling slashes in a background of a read-through part of the content on an element-by-element and line-by-line basis, such that a read-through part corresponds to a subset of all visible content of the plurality of respective elements visible within the window or tab of the browser;

inserting an advertisement at the demarcation, or pop-up an advertisement in front of the demarcation for displaying by only over a slashed portion of the content.

16. The method according to claim 15, wherein calculating a read-through rate for the content and determining whether respective elements contained in the content are read through according to a determination result of determining whether the window or the tab is being browsed and according to whether the respective elements are depicted in the window or the tab readably at a time point when determining whether the window or the tab is being browsed by the user is performed by steps of:
   determining which part of the content is text;
   for each element in the text of the content, accumulating a readable duration of each element during which the element is visible to the user;
   identifying whether an element is read through, according to whether or not the accumulated readable duration assigned to the element exceeds a read-through duration corresponding to a type of the element; and
   determining whether respective elements contained in the content are read through and calculating the read-through rate by identifying what percentage of elements in the text of the content is read through.

17. The method according to claim 16, wherein a node in the text meets an area condition that: a depicting area of the node is higher than Z % of that of a parent node of the node and a depicting area of each child node of the node is not higher than Z % of that of the node.

18. The method according to claim 17, wherein a value in a range of 65-75 is appropriate for Z.

19. A method of displaying content in a window or a tab of a browser running on a terminal, wherein:
   intermittently determine whether the window or the tab is being browsed by a user;
   calculating a read-through rate for the content and determine whether respective elements contained in the content are read through by comparing a readable duration for each of the respective elements to a respective read-through duration for each of the respective elements, according to a determination result of determining whether the window or the tab is being browsed and according to whether the respective elements are depicted in the window or the tab readably at a time point when determining whether the window or the tab is being browsed by the user and based on category of text, length of text string, size and reproduction time of static or dynamic picture, and reading history for each user;
   identifying a demarcation between an element that is read through and an element that is not read, the demarcation being a unique x-y location within the window or tab of the browser, if the read-through rate exceeds a preset threshold;
   filling slashes in a background of a read-through part of the content on an element-by-element and line-by-line basis, such that the read-through part corresponds to a subset of all visible content of the plurality of respective elements visible within the window or tab of the browser;
   inserting an advertisement at the demarcation, or pop-up an advertisement in front of the demarcation for displaying over a slashed portion of the content;
   wherein calculating a read-through rate for the content and determining whether respective elements contained in the content are read through according to a determination result of determining whether the window or the tab is being browsed and according to whether the respective elements are depicted in the window or the tab readably at a time point when determining whether the window or the tab is being browsed by the user is performed by steps of:
      determining which part of the content is text, comprising: obtaining a transverse width and a longitudinal width of a picture when assuming that the picture displays the content; dividing the picture into a plurality of regions based on the transverse width and the longitudinal width; extracting a node displayed in one of the plurality of regions from nodes in a web document; calculating an area of a region displaying a beginning of the node and containing a centre of the picture; and determining the node with the area within a preset range or with a maximal area as a beginning node of the text;
      for each element in the text of the content, accumulating a readable duration of each element during which the element is visible to the user;
      identifying whether an element is read through, according to whether or not the accumulated readable duration assigned to the element exceeds a read-through duration corresponding to a type of the element; and
      determining whether respective elements contained in the content are read through and calculating the read-through rate by identifying what percentage of elements in the text of the content is read through.

* * * * *